United States Patent
Sun

(10) Patent No.: US 12,253,641 B2
(45) Date of Patent: Mar. 18, 2025

(54) SYSTEM AND METHOD FOR SEISMIC AMPLITUDE ANALYSIS

(71) Applicant: Chevron U.S.A. Inc., San Ramon, CA (US)

(72) Inventor: Yonghe J. Sun, Cypress, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 372 days.

(21) Appl. No.: 18/046,236

(22) Filed: Oct. 13, 2022

(65) Prior Publication Data

US 2024/0125956 A1   Apr. 18, 2024

(51) Int. Cl.
*G01V 1/28*   (2006.01)
*G01V 1/30*   (2006.01)

(52) U.S. Cl.
CPC .............. *G01V 1/282* (2013.01); *G01V 1/307* (2013.01)

(58) Field of Classification Search
CPC ................ G01V 1/282; G01V 1/307
See application file for complete search history.

(56) References Cited

U.S. PATENT DOCUMENTS

| | | | |
|---|---|---|---|
| 10,191,168 B2* | 1/2019 | Peng | G01V 1/362 |
| 2019/0324167 A1* | 10/2019 | Zhang | G06F 17/18 |
| 2021/0255346 A1* | 8/2021 | Sun | G01V 20/00 |
| 2024/0069228 A1* | 2/2024 | Osypov | G01V 1/345 |

OTHER PUBLICATIONS

Yang He et al., "Towards AVO Compliant Least-Squares RTM Gathers", SEG International Exposition and 88th Annual Meeting, 2018 SEG, pp. 4408-4412.
Naoshi Aoki et al., "Fast Least-Squares Migration with a Deblurring Filter," Geophysics, vol. 74, No. 6, (Nov.-Dec. 2009), pp. WCA83-WCA93, Society of Exploration Geophysicists.

* cited by examiner

*Primary Examiner* — Elias Desta

(57) ABSTRACT

A method is described for seismic amplitude analysis that uses a set of artificial and individually separable reflectors consistent with dip fields in the subsurface volume of interest to define an AVA basis functions; the AVA basis functions are used in true-3D AVA modeling and true-3D AVA inversion. The inversion result and well logs representative of the subsurface volume of interest are used to train a model to create a rock property prediction model. The method may apply the rock property prediction model to a second seismic image to generate a rock property volume. The method is executed by a computer system.

9 Claims, 5 Drawing Sheets

SYSTEM AND METHOD FOR SEISMIC AMPLITUDE ANALYSIS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for seismic data processing and, in particular, to a technique for seismic amplitude analysis.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

One of the primary indicators of hydrocarbon accumulation is seismic amplitudes. Spatially anomalous amplitudes, amplitude versus offset (AVO), and amplitude versus angle (AVA) have been widely used for prospect identification, drilling hazard analysis, and reservoir characterization. Advances in 3D seismic acquisition and computing technology have allowed the industry to routinely apply 3D velocity tomography, full-azimuth 3D prestack depth migration, and full waveform inversion. In the past decade, artificial intelligence (AI) in the form of machine learning (ML) or deep learning has found extensive applications in seismic inversion and interpretation, leveraging both well-logging data and 3D surface seismic data. One deficiency, however, is that, paradoxically, for post-migration 3D AVO/AVA modeling and inversion, existing AVO technologies still rely heavily on the assumption of 1D earth models with horizontal layers. Another deficiency is that ML algorithms are sometimes applied to the mismatched well-log and seismic data without first separating and distilling their relationships into deterministic or stochastic sub-problems, some of which may not best suit stochastic ML algorithms. Well log measurements correspond to rock properties local to the spatial points where the measurements are taken. This cannot be said of migrated seismic data at the well locations. Post-migration seismic trace samples can be influenced over long distances by acquisition footprints, imprinted by overburden wave propagation, and blurred by the wavelets and migration aperture. These adverse effects vary spatially from point to point, from earth model to earth model, and from project to project, thus making the relationship between seismic and well data spatially non-stationary or incoherent. This, in turn, makes existing ML approaches less effective in general because the relationship is less transferable, and for deep learning (DL) in particular, because it is more difficult to identify a large number of spatially compact training pairs needed to train a DL network.

Seismic data is processed to create seismic images that can be interpreted to identify subsurface geologic features including hydrocarbon deposits. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved seismic amplitude analysis in order to identify and delineate hydrocarbon reservoirs.

SUMMARY

In accordance with some embodiments, a method of seismic amplitude analysis including receiving a seismic image including dip fields; generating a set of artificial and individually separable reflectors consistent with the dip fields; generating synthetic seismograms consisting of seismic reflectors with known amplitude variation with angle (AVA); performing seismic migration of the synthetic seismograms to generate common image point (CIP) gathers with migrated seismic reflectors; defining an AVA basis function for each migrated seismic reflector; performing windowed deconvolution of the seismic image using the AVA basis functions to generate a spatially deblurred seismic image; performing true-3D AVA modeling to create synthetic CIP angle gathers by convolving angle-dependent reflectivity with the AVA basis functions in each migrated seismic reflector's local time window accounting for dip and velocity; performing true-3D AVA inversion for CIP gather of angle or offset-dependent reflectivity or rock properties by matching synthetic CIP angle gathers with the field data CIP angle gathers to generate a seismic inversion volume; receiving well logs representative of the subsurface volume of interest; and training a model using the well logs and the seismic inversion volume to create a rock property prediction model is disclosed. The method may apply the rock property prediction model to a second seismic image to generate a rock property model.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
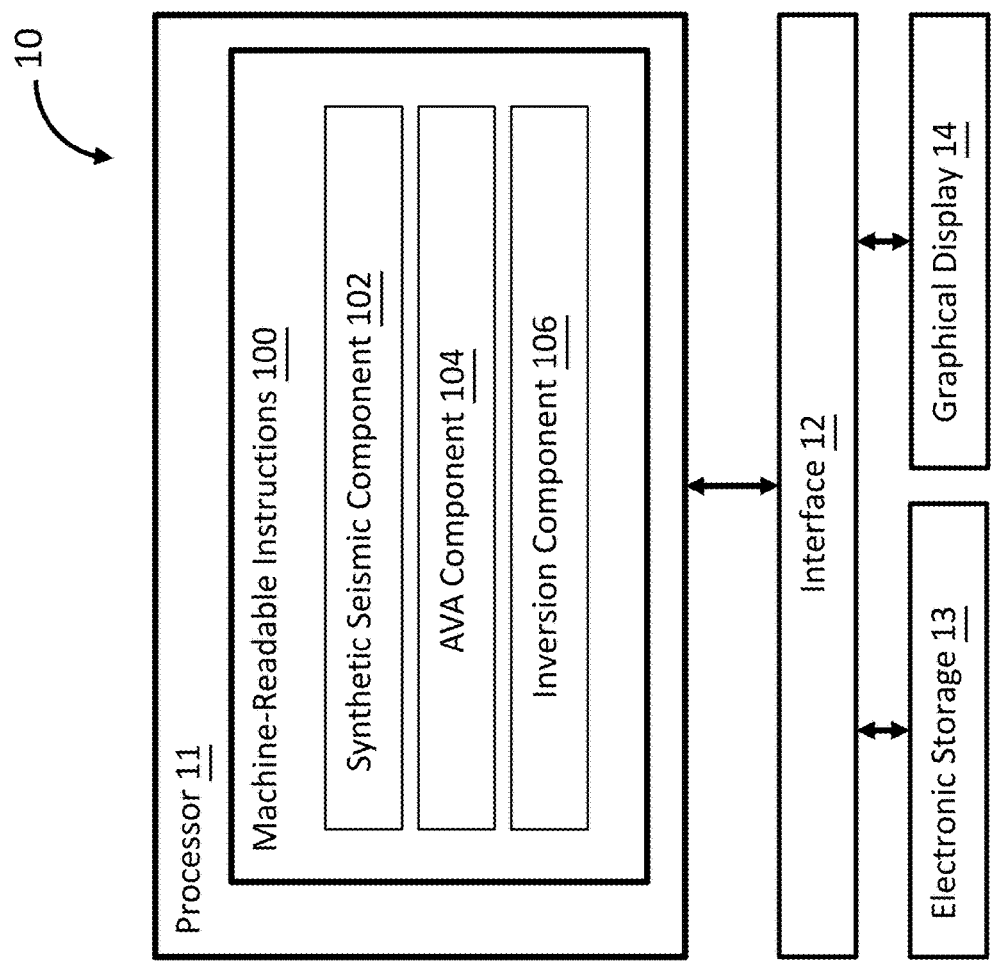
FIG. 1 is a block diagram illustrating a seismic amplitude analysis system, in accordance with some embodiments.

Described below are methods, systems, and computer readable storage media that provide a manner of seismic amplitude analysis. These embodiments avoid the assumption of 1D earth models with horizontal layers which is one of the problems with conventional methods.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Advantageously, those of ordinary skill in the art will appreciate, for example, that the embodiments provided herein may be utilized to generate a more accurate digital seismic image (i.e., the corrected digital seismic image). The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults and/or salt flanks more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

FIG. 1 is a block diagram illustrating a seismic amplitude analysis system 10, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein. The present disclosure generates a seismic volume that mitigates the spatially non-stationary and non-local adverse effects due to seismic acquisition and processing, thus making it more suitable for use in training machine-learning algorithms to derive rock properties. Even though analysis of seismic amplitude versus angle (AVA) is a primary technique for deriving rock properties and hydrocarbon indicators, available migration implementations, including Kirchhoff migration (KMIG), reverse-time migration (RTM), and shot-based Gaussian beam migration (SGBmig), are not amplitude compliant. Acquisition fold imprints and illumination shadows interfere with the identification of fluid content and mapping of amplitude anomalies. The present disclosure mitigates these issues as well.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a graphical display 14, and/or other components. Training data and volumetric rock property models may be generated by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to seismic amplitudes, information relating to well logs, and/or other information.

The graphical display 14 may refer to an electronic device that provides visual presentation of information. The graphical display 14 may include a color display and/or a non-color display. The graphical display 14 may be configured to visually present information. The graphical display 14 may present information using/within one or more graphical user interfaces. For example, the graphical display 14 may present information relating to seismic amplitudes, rock properties, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate deriving reservoir properties from seismic data. The machine-readable instructions 100 may include one or more computer program components. The machine-readable instructions 100 may include a synthetic seismic component 102, an amplitude variation with angle (AVA) component 104, an inversion component 106, and/or other computer program components.

The synthetic seismic component 102 may be configured to generate one or more synthetic seismic gathers. Generating a synthetic seismic gather may include creating, storing, making, producing, and/or otherwise generating the synthetic seismic gather. Generating a synthetic seismic gather may include generating an image including the synthetic seismic gather. In some implementations, synthetic seismic component 102 may obtain previously generated synthetic seismic gathers (e.g., retrieve the synthetic seismic gathers stored in memory). The synthetic seismic gathers may, for example, be generated using finite-difference modeling. Other generations of a synthetic seismic gathers are contemplated.

In some embodiments, the machine-readable instructions 100 include a synthetic seismic component 102 which uses finite-difference modeling (FDM) for a set of artificial and individually separable reflectors consistent with the dip fields extracted from seismic images. The reflectors are designed to have known reflectivity versus (reflection) angle which corresponds to known amplitude variation with angle (AVA) in an ideally processed synthetic data corrected for all processing induced amplitude distortions. A convenient but not necessary design choice is to have constant reflectivity versus angle (or zero variation in reflectivity versus angle). Any deviation from the expected or ideal AVA is an indication of the need for amplitude correction. The machine-readable instructions 100 also may include an AVA component 104 which defines an AVA basis function computed as synthetic 3D AVA of responses of the individually separable reflectors via 3D modeling and 3D imaging such as migrations, performs windowed deconvolution of field seismic gathers using the AVA basis functions, performs true 3D AVA modeling, and true 3D AVA inversion. The machine-readable instructions 100 may also include an inversion component 106 which may use machine-learning models to derive rock properties from well log data and the AVA products generated by the AVA component 104. Although specific operations have been identified for the components discussed herein, this is not meant to be limiting. Each component may be configured to execute operations identified as being a part of other components, and may contain other instructions, metadata, and parameters that allow it to execute other operations of use in processing data and generating images. For example, any of the components may optionally be able to generate a display that would be sent to and shown on the graphical display 14. In addition, any of the data or processed data products may be transmitted via the communication interface or the network interface and may be stored in electronic storage 13.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the graphical display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
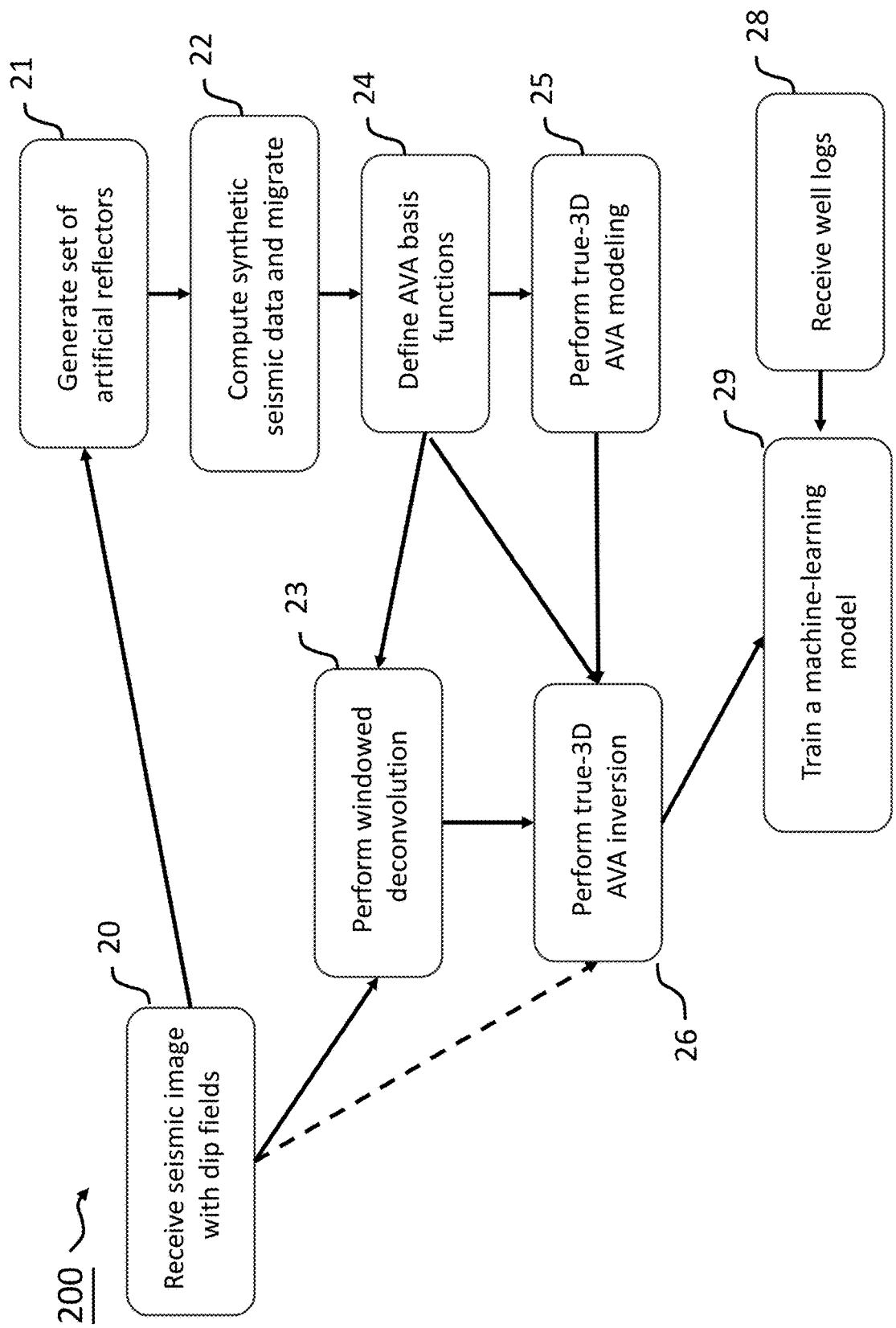
FIG. 2 illustrates a flowchart of a method of seismic amplitude analysis, in accordance with some embodiments.
Figure 3:
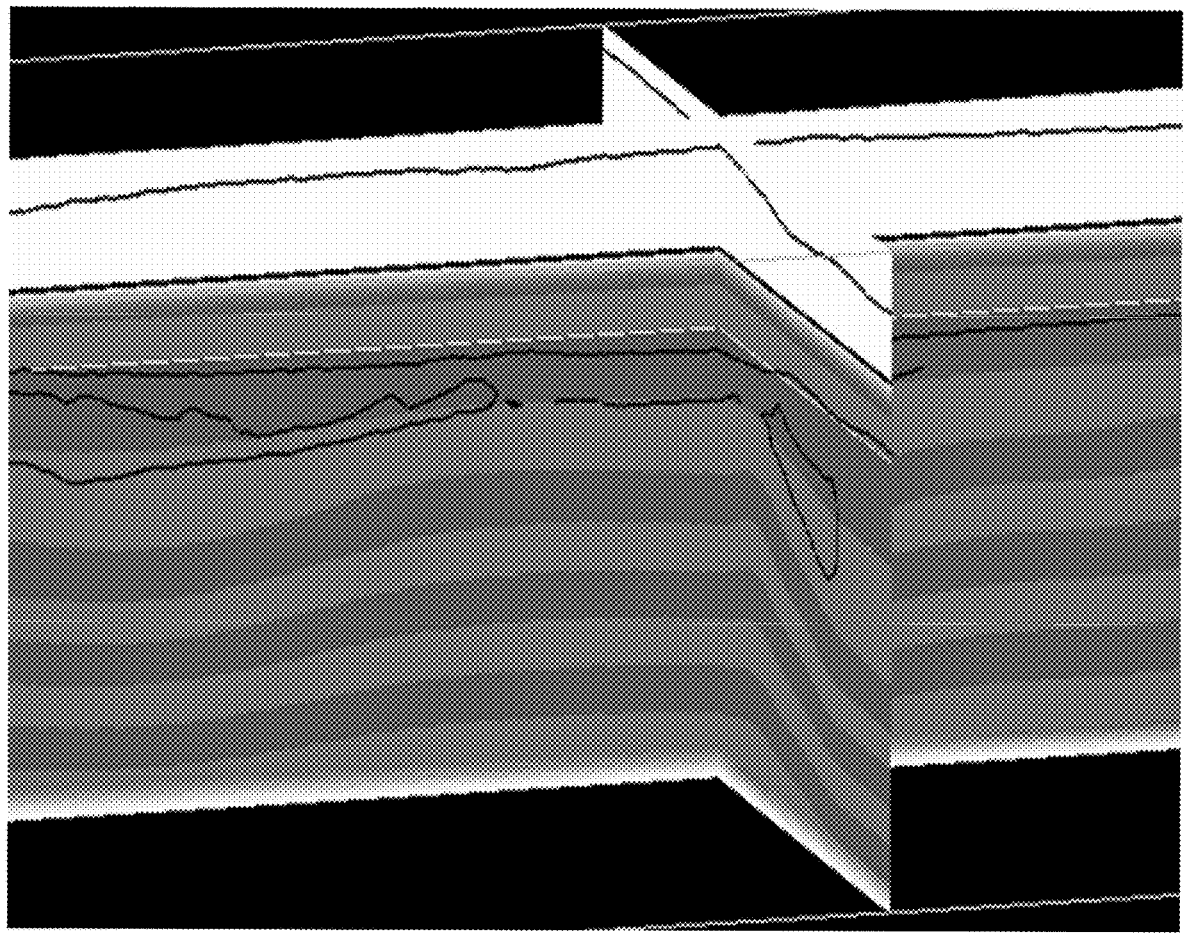
FIG. 3 is a demonstration of a step of method of seismic amplitude analysis, in accordance with some embodiments.

FIG. 2 illustrates an example method 200 performed by the system 10. The method receives at least one seismic image including dip fields at step 20. At step 21, the method generates a set of artificial reflectors that are individually separable (i.e., no significant wavelet overlap in the image of the reflectors) and consistent with the dip fields extracted from seismic images such as, for example, using a synthetic model as shown in FIG. 3, which shows a template for perturbing a density model with a set of non-interfering reflectors at boundaries of layers with alternating perturbation polarities. Step 22 computes synthetic seismograms using finite-difference modeling (FDM) for the set of artificial and individually separable reflectors consistent with the dip fields extracted from seismic images. The reflectors are designed to have known reflectivity $R(\theta)$ versus angle $\theta$. It is often convenient to design $R(\theta)$ to be a simple function such as constant, or a scaled version of $\sin^2 \theta$ or $\cos^2 \theta$. The corresponding ideal AVA responses of the reflectors are easily predictable if the overburden distortions are ignored or corrected. Each reflecting boundary will contribute one reflection event. Also in step 22, the synthetic seismograms are migrated to create common image point (CIP) gathers. The CIP gathers can be either offset gathers or angle gathers. Offset-to-angle mapping can be computed with additional modeling and migrations. The synthetic modeling starts with the well-known Shuey's 3-term approximation for reflectivity:

$$R(\theta)=R(0)+G\sin^2\theta+F(\tan^2\theta-\sin^2\theta)$$

where the reflectivity at zero reflection angle $$R(0) = \frac{1}{2}\left(\frac{\Delta V_P}{V_P} + \frac{\Delta \rho}{\rho}\right) \text{ and}$$

$$G = \frac{1}{2}\frac{\Delta V_P}{V_P} - 2\frac{V_S^2}{V_P^2}\left(\frac{\Delta \rho}{\rho} + 2\frac{\Delta V_S}{V_S}\right)$$

$$F = \frac{1}{2}\frac{\Delta V_P}{V_P}$$

where $\theta$ is the reflection angle, R is the reflectivity, $V_P$ is the P-wave (compressional) velocity, $V_S$ is the S-wave (shear) velocity, and p is the density. To avoid residual moveout in the P-wave migrated gathers, the method does not perturb Vp, so $\Delta V_P/V_P=0$. The FDM and migration are performed with, for example, the following set of model perturbations to a background model for the FDM:

Reflectivity is independent of angle: $R(\theta)=C$ (C is a constant)

either by acoustic modeling (i.e., $V_S=0$) with $\Delta\rho/\rho=2C$ and $\Delta V_S/V_S=0$ or by elastic modeling (e.g., $V_S/V_P=\frac{1}{2}$) with $\Delta\rho/\rho=2C$ $\Delta V_S/V_S=-C$.

Reflectivity weighted by a function of angle: $R(\theta)=C\cdot\cos^2\theta$ by elastic modeling (e.g., $V_S/V_P=\frac{1}{2}$) with $\Delta\rho/\rho=2C$ $\Delta V_S/V_S=0$, or by having $\pm\sin^2\theta$ instead of $\cos^2\theta$ with various perturbation combinations. The above model perturbations are examples. Other model perturbations can be used to created desired synthetic angle-dependent reflectivity $R(\theta)$.

Figure 4:
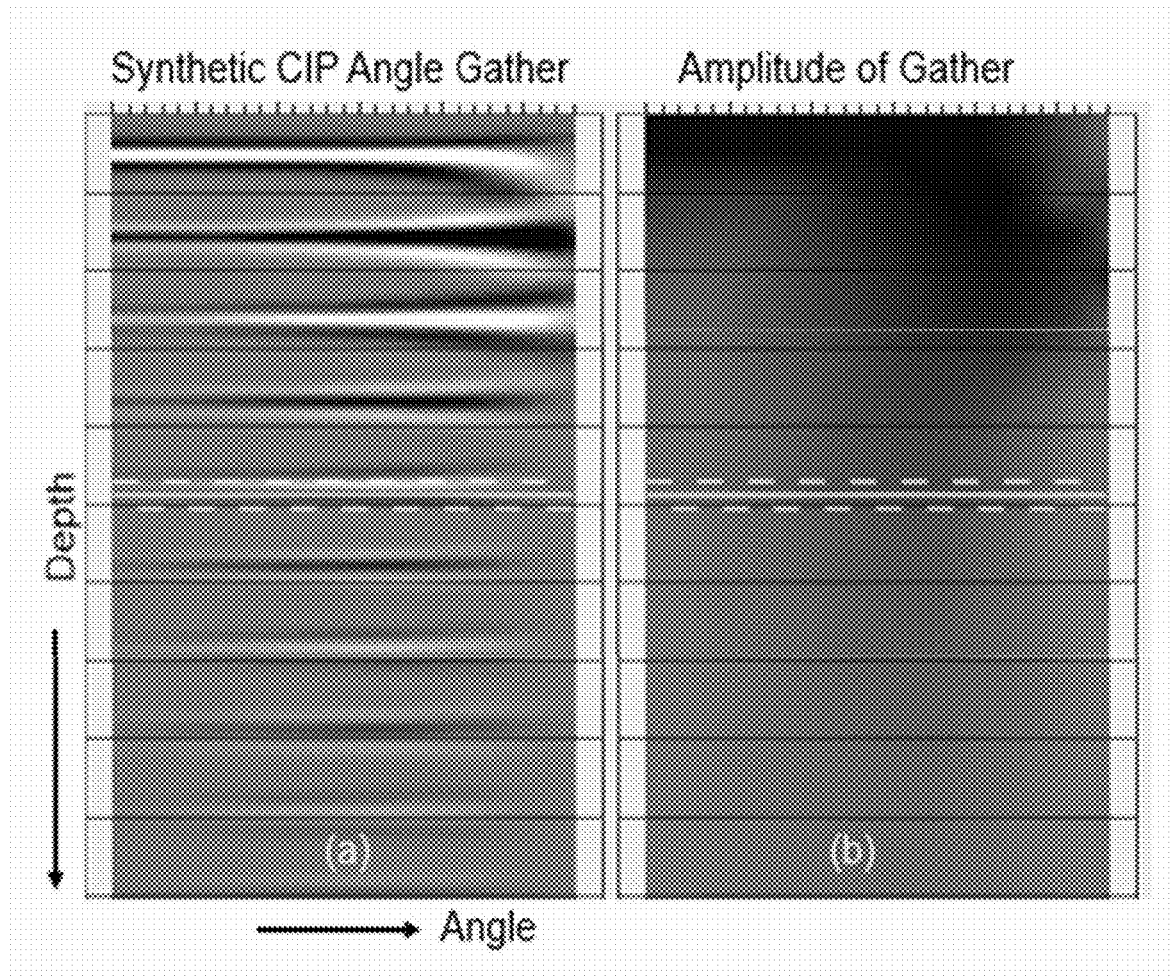
FIG. 4 is a demonstration of a step of method of seismic amplitude analysis, in accordance with some embodiments.

In step 24, the synthetic CIP gathers are used to define AVA basis functions. In some embodiments, this may be done by defining an AVA basis function as the CIP angle gather for each individual zero-AVA reflector position. Each basis function is a depth-domain wavelet as a function of depth (z), common depth point (CDP) position (x,y), reflection angle ($\theta$), and the vertical event position (e) of the reflector. Each reflector and the corresponding AVA basis function is indexed as an "event". These AVO or AVA basis functions (example shown in FIG. 4 panel (a)) are, in essence, a prestack depth migration (PSDM) image response of each modeled reflector. If the $R(\theta)$ is not constant, the AVA basis function corresponds angle independent reflectivity can be obtained by dividing the image response by $R(\theta)$ where $R(\theta)$ should be designed to be nonzero for the usable range of $\theta$. Conversely and similarly, the angle domain image response for the $R(\theta)=C$ (constant independent of $\theta$) has been computed, the image response correspond to $R(\theta)=C\cdot f(\theta)$, where $f(\theta)$ is a function of $\theta$ (e.g., $\cos^2\theta$) can simply be obtained by multiplied by $f(\theta)$. If the AVO image responses have been computed by FDM and imaging for both $R(\theta)=C$ and $R(\theta)=C\cdot f(\theta)$, a conditioned (to avoid division by 0) ratio of these two sets of responses will yield $f(\theta)$ versus offset to map the AVO responses in offset domain to the AVA responses in the angle domain. If modeling for multiple intersecting reflectors is desired, FDM and migrations can be performed for each non-intersecting set separately. For computational feasibility, the method can do low-frequency FDM. A frequency-upscaling algorithm with the optional accounting of attenuation (Q-factor) is used to reconstitute the synthetics, thereby matching possibly broader band field data wavelets. After FDM and PSDM of the synthetics, we will have the following building blocks for post-migration AVA analysis:

Reflectivity independent of angle: $R(\theta)=C$
  AVO basis functions $B_{AVO}(z,h; x,y; e)$—Synthetic CIP offset-gather
  AVA basis functions $B_{AVA}(z,\theta; x,y; e)$—Synthetic CIP angle-gather
  Amplitude scaler: $A(z,\theta; x,y)$
Reflectivity weighted by a function of angle: $R(\theta)=C\cdot\cos^2\theta$
  $\cos^2\theta$-weighted AVO basis functions $\cos^2\theta\cdot B_{AVO}(z,h; x,y; e)$
  Offset-angle mappings: $\theta(z,h; x,y)$ and $h(z,\theta; x,y)$ where the index e indicates an event corresponding to a reflector, the arguments (z,$\theta$; x,y) indicates depth-domain angle gathers at a common depth point (CDP) position (x,y) and the argument (e) is the index for an synthetic reflection events. Similarly, arguments (z,h; x,y) indicate an offset-gather. The amplitude scaler $A(z,\theta; x,y; e)$ (FIG. 4 panel (b)) is computed by picking and interpolating the peak amplitudes of the AVA basis functions $B_{AVA}(z,\theta; x,y; e)$. The $\cos^2\theta$-weighted AVO basis functions are used to compute $\cos^2\theta$ as function of offset h to compute offset-angle mapping or to enable AVO analysis instead of AVA analysis.

It should be emphasized that the above AVA basis functions and offset-angle mapping are computed using actual field data geometry, 3D FDM, and 3D PSDM, without 1D assumptions. Post-migration 3D AVA analysis using them as building blocks requires only inexpensive trace-wise or gather-wise operations. This means that, for a single gather, a single horizon, or a single reservoir, true 3D AVA analyses can be performed instantaneously on the fly through graphical user interfaces (GUIs).

Step 25 performs true-3D AVA modeling. This creates synthetic CIP angle gathers by convolving angle-dependent reflectivity with the AVA basis functions in each event's local time window accounting for dip and velocity. Since the 3D AVA basis functions are precomputed, this step is fast and amenable to instantaneous GUI interactions, improving the efficiency of the modeling. Given model perturbations ($\Delta V_P/V_P$, $\Delta V_S/V_S$, and $\Delta\rho/\rho$) such as ones derived from well logs, reflectivity $R(\theta)$ can be computed and convolved with AVA basis functions to create 3D AVA synthetics.

Figure 5:
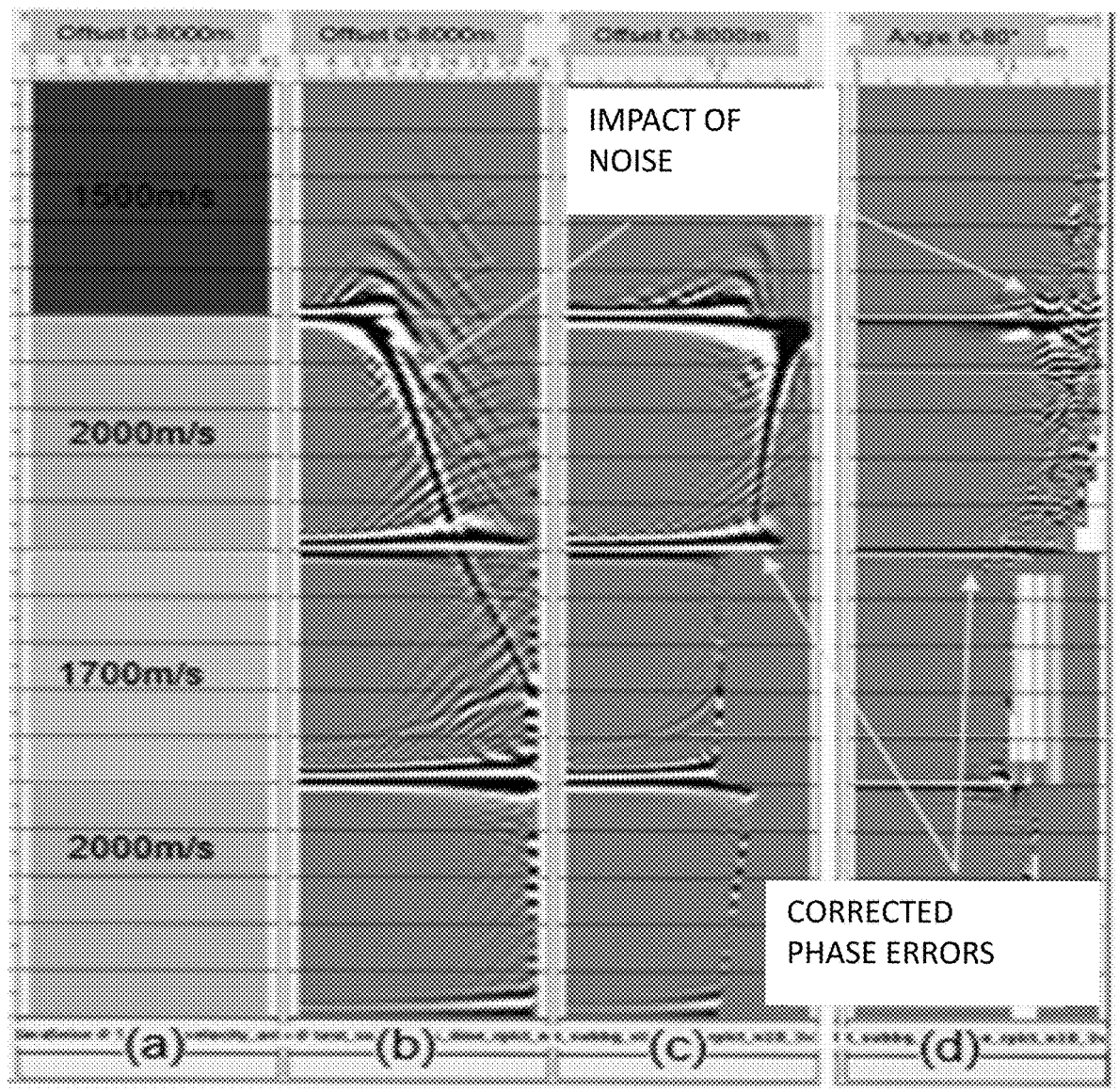
FIG. 5 is a demonstration of a step of method of seismic amplitude analysis, in accordance with some embodiments.

The seismic image received at step 20 is used as input by step 23 to perform windowed deconvolution. This step typically is performed for the entire 4D or higher dimensional image volume to convert it to reflectivity volume. The windowed deconvolution of the field data CIP gathers also uses the AVA basis functions. This is an inexpensive way to emulate the effect of least-square migration (LSM) which deblurs seismic image. The full-spectrum analysis with AVA basis functions modeled by reflector responses offers an opportunity for horizon-based data conditioning, an advantage over other LSM-emulating approaches that are based on point-spread functions. Step 23 produces a spatially deblurred CIP gathers by calculating (Windowed field data spectrum)$\div(B_{AVA}$ spectrum). This compensates for both phase and amplitude distortions (due to, for example, acquisition footprints, overburden illumination irregularities, and migrations algorithms) at every frequency, as shown in FIG. 5. FIG. 5 includes panel (a) a four-layer velocity model, panel (b) CIP offset-gather, panel (c) CIP angle-gather, and panel (d) CIP angle-gather after step 23. It emulates the effect of least-squares migration. One advantage of this method is that it offers an opportunity for horizon-based data conditioning, an advantage over other LSM-emulating approaches based on point-spread functions. The method essentially deblurs the migration image by removing the effect of the wavelet and migration aperture. The migration stretch is accounted for because both field data and the AVA basis functions are identically stretched.

Step 26 performs true-3D AVA inversion for CIP gather of angle or offset-dependent reflectivity or rock properties by matching the synthetic CIP angle gathers from step 25 with the deblurred field data CIP angle gathers from step 23. Alternatively, given a field data CIP gather, the reflectivity $R(\theta)$, residual moveouts, and/or the model perturbations can be solved as unknowns to minimize the difference between the synthetic 3D AVA synthetics and the field data CIP gather. The reflectivity can be continuous or sparse in depth. Rock properties and residual moveout can be parametrically incorporated in some representations of the reflectivity model. Given the AVA basis functions near the top and base of a reservoir, the AVA responses can be computed by varying the reservoir thickness, by fluid substitutions, or by adjusting other rock properties. The field data AVA responses of the reservoir may be optionally inverted for reservoir thickness, porosity, fluid saturation, etc., for reserve estimation.

The seismic results described above along with other seismically derived model information ($V_P$, $V_S$, $\rho$, attenuation Q, dip, etc.) are now suitable as input to a machine learning (ML) algorithm to derive rock properties statistically constrained by both seismic data and well data. The seismic data have been corrected of non-local effects such as acquisition footprints, spatial imprints of the overburden, wavelet stretch, and other migration and geometry induced blurring and distortions. ML can now focus on learning nearly point-wise statistical relationship between well-log derived rock properties and seismic-derived model parameters using spatially compact and nearly stationary operators. Each well track will provide large number of training pairs (nearly one pair per point), a requirement for training deep-learning networks. The stochastic ML tasks thus have been made more tractable by the deterministic solutions. Referring again to FIG. 2, at step 28 well logs representative of the wellbores drilled through the subsurface volume of interest are received. At step 29, the results of the previous steps are used to train a machine-learning algorithm. This step further leverages well data to obtain high resolution full-volume rock properties with statistical distributions that matches those at the well positions. The steps prior to step 29 mitigate the spatially non-stationary and non-local adverse effects due to seismic acquisition and processing. This allows ML to use spatially compact (i.e., nearly point-to-point) operators between seismic and well data, permits creation of large number of independently meaningful DL training pairs at well locations, and makes the trained networks more generalizable away from the wells.

The above components roughly correspond to steps to transform seismic and well log data to high-resolution rock and reservoir properties. There is no assumption of 1D models. Step 29 leverages well data to obtain high resolution full-volume rock properties with statistical distributions that matches those at the well positions. The objective of ML is to statistically match the well derived rock properties at the wells and extrapolate the rock properties in-between or away from the wells constrained by 3D seismic and guided by the distributions learned near wells.

Method 200 is, optionally, governed by instructions that are stored in computer memory or a non-transitory computer readable storage medium (e.g., electronic storage 13 in FIG. 1) and are executed by one or more processors (e.g., processor 11) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 200 is described as being performed by a computer system, although in some embodiments, various operations of method 200 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   a. receiving, at a computer processor, a seismic image including dip fields representative of a subsurface volume of interest;
   b. generating, via the computer processor, a set of artificial and individually separable reflectors consistent with the dip fields;
   c. generating, via the computer processor, synthetic seismograms consisting of seismic reflectors with known amplitude variation with angle (AVA);

d. performing seismic migration, via the computer processor, of the synthetic seismograms to generate common image point (CIP) gathers with migrated seismic reflectors;
e. defining an AVA basis function for each migrated seismic reflector wherein the AVA basis function is a depth-domain wavelet as a function of depth (z), CIP position (x,y), reflection angle (θ), and the vertical event position (e) of the migrated seismic reflector;
f. performing windowed deconvolution of the seismic image using the AVA basis functions to generate a spatially deblurred seismic image;
g. performing true-3D AVA modeling to create synthetic CIP angle gathers by convolving angle-dependent reflectivity with the AVA basis functions in each migrated seismic reflector's local time window accounting for dip and velocity;
h. performing true-3D AVA inversion for CIP gather of angle or offset-dependent reflectivity or rock properties by matching synthetic CIP angle gathers with the field data CIP angle gathers to generate a seismic inversion volume;
i. receiving well logs representative of the subsurface volume of interest; and
j. training a model using the well logs and the seismic inversion volume to create a rock property prediction model.

2. The method of claim 1 wherein the synthetic seismograms are generated using finite-difference modeling.

3. The method of claim 1 further comprising applying the rock property prediction model to a second seismic image to generate a rock property volume.

4. A computer system, comprising:
one or more processors;
memory; and
one or more programs, wherein the one or more programs are stored in the memory and configured to be executed by the one or more processors, the one or more programs including instructions that when executed by the one or more processors cause the system to:
a. receive, at the one or more processors, a seismic image including dip fields representative of a subsurface volume of interest;
b. generate a set of artificial and individually separable reflectors consistent with the dip fields;
c. generate synthetic seismograms consisting of seismic reflectors with known amplitude variation with angle (AVA) from the set of artificial and individually separable reflectors;
d. perform seismic migration of the synthetic seismograms to generate common image point (CIP) gathers with migrated seismic reflectors;
e. define an AVA basis function for each migrated seismic reflector wherein the AVA basis function is a depth-domain wavelet as a function of depth (z), CIP position (x,y), reflection angle (θ), and the vertical event position (e) of the migrated seismic reflector;
f. perform windowed deconvolution of the seismic image using the AVA basis functions to generate a spatially deblurred seismic image;
g. perform true-3D AVA modeling to create synthetic CIP angle gathers by convolving angle-dependent reflectivity with the AVA basis functions in each migrated seismic reflector's local time window accounting for dip and velocity;
h. perform true-3D AVA inversion for CIP gather of angle or offset-dependent reflectivity or rock properties by matching synthetic CIP angle gathers with the field data CIP angle gathers to generate a seismic inversion volume;
i. receive well logs representative of the subsurface volume of interest; and
j. train a model using the well logs and the seismic inversion volume to create a rock property prediction model.

5. The system of claim 4 wherein the synthetic seismograms are generated using finite-difference modeling.

6. The system of claim 4 further comprising applying the rock property prediction model to a second seismic image to generate a rock property volume.

7. A non-transitory computer readable storage medium storing one or more programs, the one or more programs comprising instructions, which when executed by an electronic device with one or more processors and memory, cause the device to
a. receive, at the one or more processors, a seismic image including dip fields representative of a subsurface volume of interest;
b. generate, via the one or more processors, a set of artificial and individually separable reflectors consistent with the dip fields;
c. generate, via the one or more processors, synthetic seismograms consisting of seismic reflectors with known amplitude variation with angle (AVA);
d. perform seismic migration, via the one or more processors, of the synthetic seismograms to generate common image point (CIP) gathers with migrated seismic reflectors;
e. define an AVA basis function for each migrated seismic reflector wherein the AVA basis function is a depth-domain wavelet as a function of depth (z), CIP position (x,y), reflection angle (θ), and the vertical event position (e) of the migrated seismic reflector;
f. perform windowed deconvolution of the seismic image using the AVA basis functions to generate a spatially deblurred seismic image;
g. perform true-3D AVA modeling to create synthetic CIP angle gathers by convolving angle-dependent reflectivity with the AVA basis functions in each migrated seismic reflector's local time window accounting for dip and velocity;
h. perform true-3D AVA inversion for CIP gather of angle or offset-dependent reflectivity or rock properties by matching synthetic CIP angle gathers with the field data CIP angle gathers to generate a seismic inversion volume;
i. receive well logs representative of the subsurface volume of interest; and
j. train a model using the well logs and the seismic inversion volume to create a rock property prediction model.

8. The device of claim 7 wherein the synthetic seismograms are generated using finite-difference modeling.

9. The device of claim 7 further comprising applying the rock property prediction model to a second seismic image to generate a rock property volume.

* * * * *